US010056787B2

(12) United States Patent
Morikawa

(10) Patent No.: US 10,056,787 B2
(45) Date of Patent: Aug. 21, 2018

(54) RECTIFIER CIRCUIT, AND CONTACTLESS POWER SUPPLY DEVICE

(71) Applicant: Panasonic Intellectual Property Management Co., Ltd., Osaka (JP)

(72) Inventor: Hiroyasu Morikawa, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 72 days.

(21) Appl. No.: 15/331,716

(22) Filed: Oct. 21, 2016

(65) Prior Publication Data

US 2017/0040842 A1 Feb. 9, 2017

Related U.S. Application Data

(63) Continuation of application No. PCT/JP2015/002340, filed on May 8, 2015.

(30) Foreign Application Priority Data

May 9, 2014 (JP) .................................. 2014-097585

(51) Int. Cl.
*H02J 50/10* (2016.01)
*H02J 50/12* (2016.01)
(Continued)

(52) U.S. Cl.
CPC .............. *H02J 50/12* (2016.02); *H02J 17/00* (2013.01); *H02J 50/10* (2016.02);
(Continued)

(58) Field of Classification Search
CPC ............ H02J 50/12; H02J 50/10; H02J 17/00; H02M 3/33592; H02M 7/217; Y02B 70/1475
See application file for complete search history.

(56) References Cited

U.S. PATENT DOCUMENTS 4,811,191 A * 3/1989 Miller .................... G01R 19/22
327/104
5,055,994 A * 10/1991 Schoofs .............. H02M 7/2176
327/100
(Continued)

FOREIGN PATENT DOCUMENTS

CA 2326734 10/1999
JP 4-117133 4/1992
(Continued)

OTHER PUBLICATIONS

International Search Report of PCT application No. PCT/JP2015/002340 dated Jul. 14, 2015.
(Continued)

*Primary Examiner* — Daniel Kessie
(74) *Attorney, Agent, or Firm* — McDermott Will & Emery LLP

(57) ABSTRACT

The rectifier circuit includes: three terminals A, K, VR; voltage comparator including a positive input terminal, a negative input terminal, and a comparative output terminal; current switching unit including source terminal, drain terminal, and control terminal; first switching unit that conducts or cuts off between source terminal and control terminal of the current switching unit; second switching unit that conducts or cuts off between control terminal of the current switching unit and terminal VR; and reference voltage generator that uses terminal A and terminal VR as input terminals, and includes a voltage output terminal. The voltage output terminal of reference voltage generator is connected to the negative input terminal of the voltage comparator, terminal K is connected to the positive input terminal of voltage comparator, and current flow between first switching unit and second switching unit is exclusively (Continued)

allowed or interrupted by a signal output from the comparative output terminal of voltage comparator).

18 Claims, 12 Drawing Sheets

(51) Int. Cl.
*H02J 17/00* (2006.01)
*H02M 7/217* (2006.01)
*H02M 3/335* (2006.01)

(52) U.S. Cl.
CPC ....... *H02M 3/33592* (2013.01); *H02M 7/217* (2013.01); *Y02B 70/1475* (2013.01)

(56) References Cited

U.S. PATENT DOCUMENTS

| | | | | |
|---|---|---|---|---|
| 6,469,564 | B1* | 10/2002 | Jansen | G06G 7/62 327/365 |
| 7,636,011 | B2* | 12/2009 | Frederick | H02J 1/10 327/530 |
| 7,732,945 | B2* | 6/2010 | Gotoh | H02M 7/217 307/107 |
| 8,710,869 | B2* | 4/2014 | Hazucha | H03F 3/45183 327/66 |
| 9,621,020 | B2* | 4/2017 | Hu | H02M 1/08 |
| 9,673,192 | B1* | 6/2017 | Lopata | H01L 27/0629 |
| 2003/0133313 | A1* | 7/2003 | Criscione | H02M 3/1588 363/21.06 |
| 2005/0168203 | A1* | 8/2005 | Dwarakanath | H02M 3/1588 323/282 |
| 2005/0218964 | A1 | 10/2005 | Oswald et al. | |
| 2006/0064141 | A1 | 3/2006 | Shodo | |
| 2008/0123383 | A1* | 5/2008 | Shionoiri | H01L 27/0629 363/127 |
| 2011/0273206 | A1* | 11/2011 | Lee | H02M 1/08 327/109 |
| 2012/0075897 | A1* | 3/2012 | Fujita | H02M 7/217 363/127 |
| 2015/0280606 | A1* | 10/2015 | Yoshida | H02M 7/217 307/11 |

FOREIGN PATENT DOCUMENTS

| | | |
|---|---|---|
| JP | 11-233730 | 8/1999 |
| JP | 2002-511692 | 4/2002 |
| JP | 2005-295794 | 10/2005 |
| JP | 2006-050762 | 2/2006 |
| JP | 2007-028888 | 2/2007 |
| WO | 2010/082480 | 7/2010 |

OTHER PUBLICATIONS

C.-S. A. Gong et al., "Efficient CMOS Rectifier for Inductively Power-Harvested Implants", Electron Devices and Solid-State Circuits, IEEE International Conference, 2008.

S. Guo et al., "An Efficiency-Enhanced CMOS Rectifier With Unbalanced-Biased Comparators for Transcutaneous-Powered High-Current Implants", IEEE J. Solid-State Circuits, vol. 44, No. 6, pp. 1796-1804, Jun. 2009.

C.-L. Chen, K.-H. Chen and S.-I. Liu, "Efficiency-enhanced CMOS rectifier for wireless telemetry", Electronics Letters, Aug. 2007, vol. 43 No. 18, IET Journals & Magazines.

* cited by examiner

RECTIFIER CIRCUIT, AND CONTACTLESS POWER SUPPLY DEVICE

BACKGROUND

1. Technical Field

The present disclosure relates to a rectifier circuit, in particular, to a rectifier circuit including a current switching unit that allows a current to flow in one direction in response to an output signal from a voltage comparator and interrupts a reverse current, and to a contactless power supply device that includes a power supply part having the rectifier circuit.

2. Description of the Related Art

Smart cards and RFID (Radio Frequency Identifier) tags which have no battery as a power source communicate by drawing, via an antenna, power from an electromagnetic field produced by a communication device.

In recent years, there is a trend that smart cards store more biological information than ever on a non-volatile memory to provide secure authentication. To enable such smart cards to process more data in a short time, a faster internal CPU (Central Processing Unit) and faster access to a memory have been demanded. Generally, increases in a speed of a CPU and in a speed of access to a memory are accompanied by an increase in power consumption, which requires such smart cards to draw power from an electromagnetic field more efficiently.

With the spread of NFC (Near Field Communication)-enabled mobile devices, RFID tags are now in widespread use. For example, RFID tags are used in authentication between devices. A mobile device, which is required to operate for many hours, needs to produce a smaller electromagnetic field that enables communication between an RFID tag and the mobile device, so as to suppress an amount of power consumed by a built-in battery. Because a margin of positional discrepancy and a margin of distance between devices in communication are necessary, an RFID tag is required to efficiently draw power from a small electromagnetic field and to operate at low power.

Drawing power from an electromagnetic field requires generating a DC power source from an AC voltage generated across a terminal of an antenna. To enable this function, a rectifier circuit is used. Generally, an IC (Integrated Circuit) chip for a smart card and for a RFID tag is produced using a CMOS (Complementary Metal-Oxide Semiconductor) process, and thus a rectifier circuit in such an IC chip is formed of MOS transistors. A circuit illustrated in FIG. 12 described in PTL 1 has been conventionally used.

In the rectifier circuit illustrated in FIG. 12, terminal A is connected to a source of P-channel MOS transistor Tr1, and terminal K is connected to a gate to which a drain is commonly connected. Terminal A is connected to a source of P-channel MOS transistor Tr2 for selecting a connection destination of a back gate of P-channel MOS transistor Tr1, and terminal K is connected to a gate of P-channel MOS transistor Tr2. Terminal K is connected to a source of P-channel MOS transistor Tr3 for selecting a connection destination of the back gate of P-channel MOS transistor Tr1, and terminal A is connected to a gate of P-channel MOS transistor Tr3. A drain of P-channel MOS transistor Tr2 and a drain of P-channel MOS transistor Tr3 are commonly connected to the back gate of P-channel MOS transistor Tr1.

In the circuit of FIG. 12, when a voltage across terminal A is greater than a voltage across terminal K by at least threshold voltage Vtp of P-channel MOS transistor Tr1, P-channel MOS transistor Tr1 is brought into a conductive state, allowing a current to flow from terminal A to terminal K. At this time, P-channel MOS transistor Tr2 is also brought into a conductive state. This causes the back gate and the source of P-channel MOS transistor Tr1 to have an identical voltage, preventing a leak voltage caused by parasitic diode D1 and thus preventing power losses. When a voltage across terminal A is less than a voltage across terminal K, P-channel MOS transistor Tr1 is cut off, interrupting a current flowing from terminal K to terminal A. At this time, if a voltage across terminal A drops by greater than threshold voltage Vtp relative to a voltage across terminal K, P-channel MOS transistor Tr3 is brought into a conductive state. This causes the back gate and the drain of P-channel MOS transistor Tr1 to have an identical voltage, preventing a leak voltage caused by parasitic diode D2 and thus preventing power losses. Because circuits are each formed of a MOS transistor, a decrease in speed due to a reverse recovery time of a PN junction diode does not occur during current switching, enabling a high-speed switching.

In the circuit of FIG. 12, however, for current Id to flow from terminal A to terminal K, a voltage across terminal A is required to be increased by threshold voltage Vtp of the MOS transistor relative to a voltage across terminal K, resulting in a power loss of Vtp×Id.

As a unit that reduces power losses due to the threshold voltage, a rectifier circuit is described in PTL 2 in which a MOS switch is used in place of a diode constituted by a MOS transistor. FIG. 13 illustrates the rectifier circuit described in PTL 2.

In the rectifier circuit illustrated in FIG. 13, terminal A, terminal K, and output node 65 of voltage comparator 62 are respectively connected to a source, a drain, and a gate of N-channel MOS transistor 61. Voltage comparator 62 has two bipolar transistors 68, 69 each having an emitter, a collector, and a base, and two resistors 66, 67. The emitter of bipolar transistor 68 is a positive input of voltage comparator 62, while the emitter of bipolar transistor 69 is a negative input of voltage comparator 62. Two resistors 66 and 67 are connected in series between the collectors of bipolar transistors 68 and 69. The collector of bipolar transistor 68 is output node 65 of voltage comparator 62, and the bases of two bipolar transistors 68 and 69 are connected to the collector of bipolar transistor 69.

In the circuit illustrated in FIG. 13, when a voltage across terminal A is greater than a voltage across terminal K, bipolar transistor 68 is cut off, and output node 65 of voltage comparator 62 is pulled up by resistor 66. Consequently, MOS transistor 61 is brought into a conductive state, allowing a current to flow from terminal A to terminal K. When a voltage across terminal A is less than a voltage across terminal K, bipolar transistor 68 is brought into a conductive state, allowing a current to flow through resistor 66, resulting in reduced voltage at output node 65 of voltage comparator 62. Consequently, MOS transistor 61 is cut off, interrupting a current flowing from terminal K to terminal A. If bipolar transistors 68 and 69 have shapes identical to each other, and resistors 66 and 67 are of identical resistance, when terminal A has a voltage that allows a current to flow from terminal A to terminal K and that interrupt a current flowing in a reverse direction, the voltage of terminal A is substantially identical to a voltage across terminal K. Thus, power losses due to a threshold voltage of a MOS transistor, which is the disadvantage of the circuit of FIG. 12, are reduced.

Other than PTL 2, NPL 1 and NPL 2 also describe a method for implementing a rectifier circuit that uses a MOS switch.

CITATION LIST

Patent Literatures

PTL 1: Unexamined Japanese Patent Publication No. 11-233730
PTL 2: Japanese Translation of PCT Publication No. 2002-511692 Non-Patent Literatures
NPL 1: C.-S. A. Gong, et al., "Efficient CMOS Rectifier for Inductively Power-Harvested Implants", Electron Devices and Solid-State Circuits, IEEE International Conference 2008.
NPL 2: S. Guo, et al., "An Efficiency-Enhanced CMOS Rectifier With Unbalanced-Biased Comparators for Transcutaneous-Powered High-Current Implants", IEEE J. Solid-State Circuits, Vol. 44, No. 6, pp. 1796-1804, June 2009.

SUMMARY

To mount the circuit illustrated in FIG. 13 on an IC chip for a smart card and for an RFID tag, the IC chip needs to be produced through the CMOS process so that the IC chip is produced at low cost. Accordingly, bipolar transistors 68 and 69 need to be replaced with N-channel MOS transistors. FIG. 14 illustrates a circuit configured by replacing bipolar transistors 68 and 69 of the circuit illustrated in FIG. 13 with N-channel MOS transistors. Generally, a relative variation in threshold voltages of two MOS transistors is greater than a relative variation in threshold voltages of two bipolar transistors. Therefore, with bipolar transistors replaced with MOS transistors, an input-offset voltage of voltage comparator 62 increases, and when a voltage across terminal A is less than a voltage across terminal K, a reverse current flowing from terminal K to terminal A is not interrupted, producing power losses. Reducing a variation in threshold voltages of the MOS transistors, which variation causes the power losses, requires gate areas of the MOS transistors to be increased. Consequently, gate capacitances of N-channel MOS transistors 70 and 71 increase, and when an AC voltage is applied to terminal K, a delay in a response of voltage comparator 62 increases. The delay in the response of voltage comparator 62 generates a reverse current, leading to power losses.

NPL 1 and NPL 2 each describe a different method for implementing a rectifier circuit. However, the rectifier circuits in NPL 1 and NPL 2 operate at frequencies ranging from about 1.5 MHz to about 2 MHz, and thus do not operate at frequencies greater than 13.56 MHz or more necessary to allow the rectifier circuits to be applied to a smart card and an RFID tag.

The present disclosure provides a rectifier circuit that has low power losses and that operates at high frequencies, and a contactless power supply device, typified by a smart card and an RFID tag, which has an improved power supply capability achieved by mounting the rectifier circuit to a power supply circuit.

A first rectifier circuit that overcomes the above disadvantage includes first terminal (A), second terminal (K), and third terminal (VR). The first rectifier circuit allows a current to flow in a direction from first terminal (A) to second terminal (K), and interrupts a reverse current flowing from second terminal (K) to first terminal (A). A voltage across third terminal (VR) is set to be greater than a voltage across first terminal (A). The first rectifier circuit includes: voltage comparator (B1) including a positive input terminal, a negative input terminal, and a comparative output terminal; current switching unit (SW0) including source terminal (S), drain terminal (D), and control terminal (G); first switching unit (SW1) that conducts or cuts off between source terminal (S) and control terminal (G) of the current switching unit; second switching unit (SW2) that conducts or cuts off between control terminal (G) of the current switching unit and third terminal (VR); and reference voltage generator (B2) that uses first terminal (A) and third terminal (VR) as input terminals, and includes a voltage output terminal. The voltage output terminal of reference voltage generator (B2) is connected to the negative input terminal of voltage comparator (B1). Second terminal (K) is connected to the positive input terminal of voltage comparator (B1). The comparative output terminal of voltage comparator (B1) is connected to first switching unit (SW1) and second switching unit (SW2). When a difference in voltage between the positive input terminal and the negative input terminal of voltage comparator (B1) is greater than a threshold, the first rectifier circuit causes first switching unit (SW1) to be in a conductive state, and causes second switching unit (SW2) to be cut off, so that current switching unit (SW0) is cut off. When a difference in voltage between the positive input terminal and the negative input terminal of voltage comparator (B1) is less than the threshold, the first rectifier circuit causes first switching unit (SW1) to be cut off, and causes second switching unit (SW2) to be in a conductive state, so that current switching unit (SW0) is brought into a conductive state.

A second rectifier circuit, which is another unit that overcomes the disadvantage, includes first terminal (A), second terminal (K), and third terminal (VR). The second rectifier circuit allows a current to flow in a direction from first terminal (A) to second terminal (K) and interrupts a reverse current flowing from second terminal (K) to first terminal (A). A voltage across third terminal (VR) is set to be less than a voltage across second terminal (K). The second rectifier circuit includes: voltage comparator (B1) including a positive input terminal, a negative input terminal, and a comparative output terminal; current switching unit (SW0) including source terminal (S), drain terminal (D), and control terminal (G); first switching unit (SW1) that conducts or cuts off between source terminal (S) and control terminal (G) of the current switching unit; second switching unit (SW2) that conducts or cuts off between control terminal (G) of the current switching unit and third terminal (VR); and reference voltage generator (B2) that uses second terminal (K) and third terminal (VR) as input terminals, and includes a voltage output terminal. The voltage output terminal of reference voltage generator (B2) is connected to the negative input terminal of voltage comparator (B1). First terminal (A) is connected to the positive input terminal of voltage comparator (B1). The comparative output terminal of voltage comparator (B1) is connected to first switching unit (SW1) and second switching unit (SW2). When a difference in voltage between the positive input terminal and the negative input terminal of voltage comparator (B1) is greater than a threshold, the second rectifier circuit causes first switching unit (SW1) to be cut off, and causes second switching unit (SW2) to be in a conductive state, so that current switching unit (SW0) is brought into a conductive state. When a difference in voltage between the positive input terminal and the negative input terminal of voltage comparator (B1) is less than the threshold, the second rectifier circuit causes first switching unit (SW1) to be in a conductive state, and causes second switching unit (SW2) to be cut off, so that current switching unit (SW0) is cut off.

The present disclosure enables a rectifier circuit to have low power losses and to operate at high frequencies, and a contactless power supply device to have an improved power supply capability.

DETAILED DESCRIPTION

First Exemplary Embodiment

Figure 1:
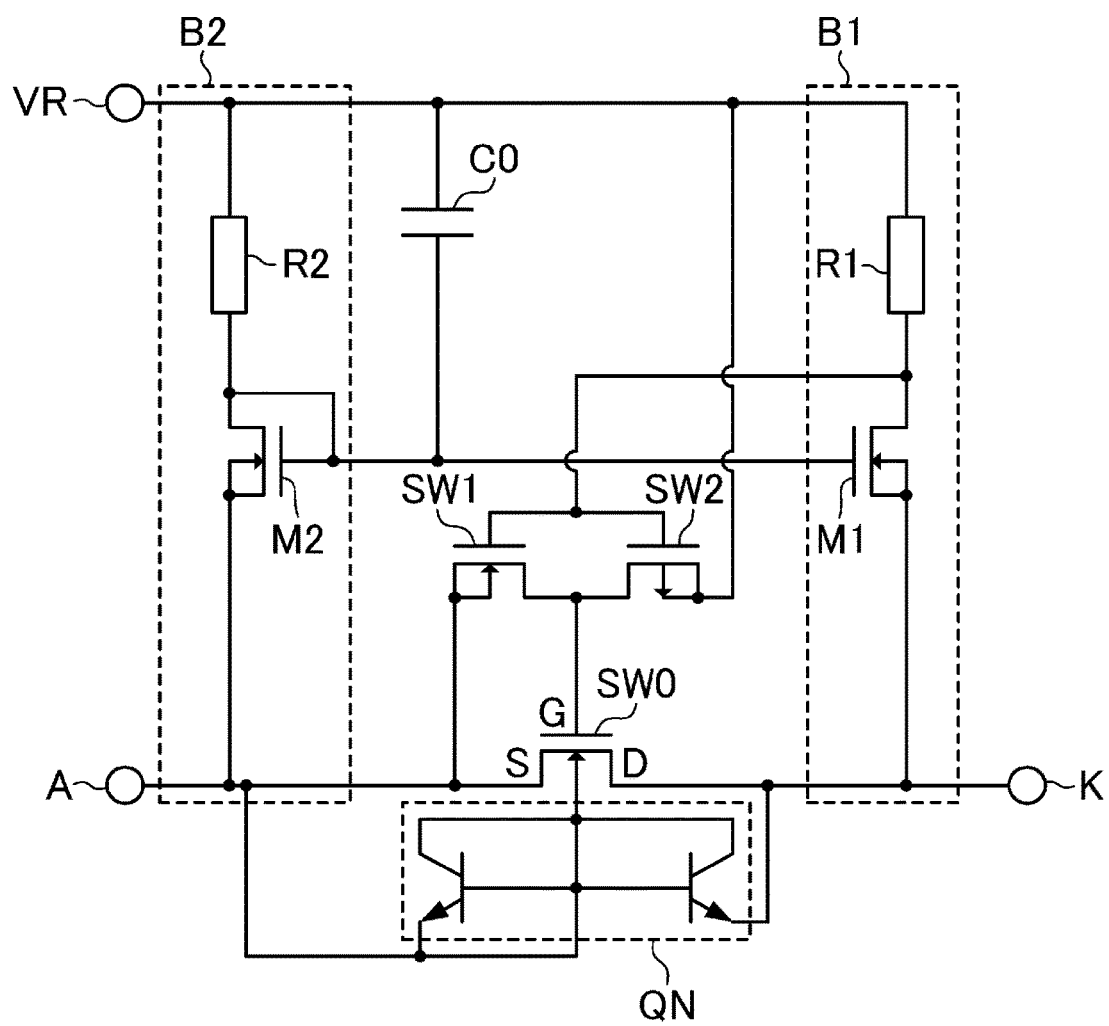
FIG. 1 illustrates an example configuration of a rectifier circuit according to a first exemplary embodiment of the present disclosure.

FIG. 1 illustrates an example configuration of a rectifier circuit according to a first exemplary embodiment of the present disclosure. The rectifier circuit of FIG. 1 includes three terminals A, K, VR and is formed of N-channel MOS transistor SW0 as a current switching unit, voltage comparator B1, and reference voltage generator B2. N-channel MOS transistor SW1 operating as a switch is connected between a source and a gate of N-channel MOS transistor SW0. P-channel MOS transistor SW2 operating as a switch is connected between the gate of N-channel MOS transistor SW0 and terminal VR. N-channel MOS transistor SW0 is formed on a triple well, with a back gate connected to the source and to an N-well substrate. QN indicates a parasitic bipolar transistor incorporated inside N-channel MOS transistor SW0.

Reference voltage generator B2 is formed of N-channel MOS transistor M2 in which a gate and a drain are commonly connected, and resistor R2. Resistor R2 is connected between terminal VR and the drain of N-channel MOS transistor M2. Terminal A is connected to the source of N-channel MOS transistor M2. The drain of N-channel MOS transistor M2 is an output terminal. Capacitor C0 is connected between terminal VR and the output terminal. Voltage comparator B1 is formed of N-channel MOS transistor M1 and resistor R1. Terminal K as a positive input terminal is connected to a source of N-channel MOS transistor M1. A negative input terminal, to which the output terminal of reference voltage generator B2 is connected, is connected to a gate of N-channel MOS transistor M1. The output terminal commonly connected to gates of N-channel MOS transistor SW1 and P-channel MOS transistor SW2 is connected to a drain of N-channel MOS transistor M1. The drain of N-channel MOS transistor M1 is a comparative output terminal. Resistor R1 is connected between the drain of N-channel MOS transistor M1 and terminal VR.

An operation of the rectifier circuit of FIG. 1 will now be described. An effective DC voltage is applied between terminal A and terminal VR, and an AC voltage is applied to terminal K. A voltage across terminal VR is set to be greater than a voltage across terminal A so that N-channel MOS transistor M2 can operate. At this time, reference voltage generator B2 outputs a voltage Vpa+Vgsn2, that is, a voltage greater than voltage Vpa across terminal A by voltage Vgsn2 between the gate and the source of N-channel MOS transistor M2. The output voltage from reference voltage generator B2 is input to a negative input terminal of voltage comparator B1. In the case where a threshold voltage of N-channel MOS transistor M1 is set to Vtn1, when AC voltage Vpk across terminal K is greater than Vpa+Vgsn2−Vtn1, N-channel MOS transistor M1 is cut off, and an amount of a current flowing through resistor R1 decreases, so that an output voltage from voltage comparator B1 approaches the voltage across terminal VR. Correspondingly, P-channel MOS transistor SW2 is cut off, and N-channel MOS transistor SW1 is brought into a conductive state. This causes N-channel MOS transistor SW0 to be cut off, interrupting a current flowing from terminal K to terminal A. At this time, a forward voltage is not applied to an effective diode constituted by parasitic bipolar transistor QN, so that power losses due to a reverse current are negligible. Conversely, when AC voltage Vpk across terminal K is less than Vpa+Vgsn2−Vtn1, N-channel MOS transistor M1 is brought into a conductive state, and an amount of a current flowing through resistor R1 increases, so that an output voltage from voltage comparator B1 approaches a voltage across terminal K. Correspondingly, P-channel MOS transistor SW2 is brought into a conductive state, and N-channel MOS transistor SW1 is cut off. This causes N-channel MOS transistor SW0 to be in a conductive state, allowing a current to flow from terminal A to terminal K. At this time, a forward voltage is applied to the effective diode constituted by parasitic bipolar transistor QN, with no adverse effect on a rectifying operation.

The higher a frequency of an AC voltage across terminal K is, the larger a charge-discharge current that flows to the gate of N-channel MOS transistor M1 when N-channel MOS transistor M1 is switched. The charge-discharge current is supplied from capacitor C0, enabling a high-speed switching of N-channel MOS transistor M1 and thus enabling the rectifier circuit to operate at high frequencies. Although capacitor C0 of FIG. 1 is connected between an output of reference voltage generator B2 and terminal VR, a similar effect can be achieved by connecting capacitor C0 between the output of reference voltage generator B2 and terminal A. If a parasitic capacitance to be added to the output of reference voltage generator B2 is sufficiently large, the parasitic capacitance arising from, for example, the gate of N-channel MOS transistor M2, capacitor C0 is not necessarily required.

As described above, the configuration of the rectifier circuit of FIG. 1 enables the rectifier circuit to operate at high frequencies. However, depending on gate lengths and gate widths of N-channel MOS transistors M1, M2, a variation in a threshold voltage of voltage comparator B1 increases, which may result in power losses due to a reverse current flowing from terminal K to terminal A. In that case, a ratio of the gate width to the gate length of N-channel MOS transistor M1 is selected to be effectively lower than a ratio of the gate width to the gate length of N-channel MOS transistor M2. Accordingly, occurrence of a reverse current is prevented by adjusting N-channel MOS transistor SW0 to be in the conductive state when a voltage across terminal K decreases by greater than fixed offset voltage Vofs relative to a voltage across terminal A and selecting offset voltage Vofs to be greater than or equal to a variation in the threshold voltage of voltage comparator B1.

Second Exemplary Embodiment

Figure 2:
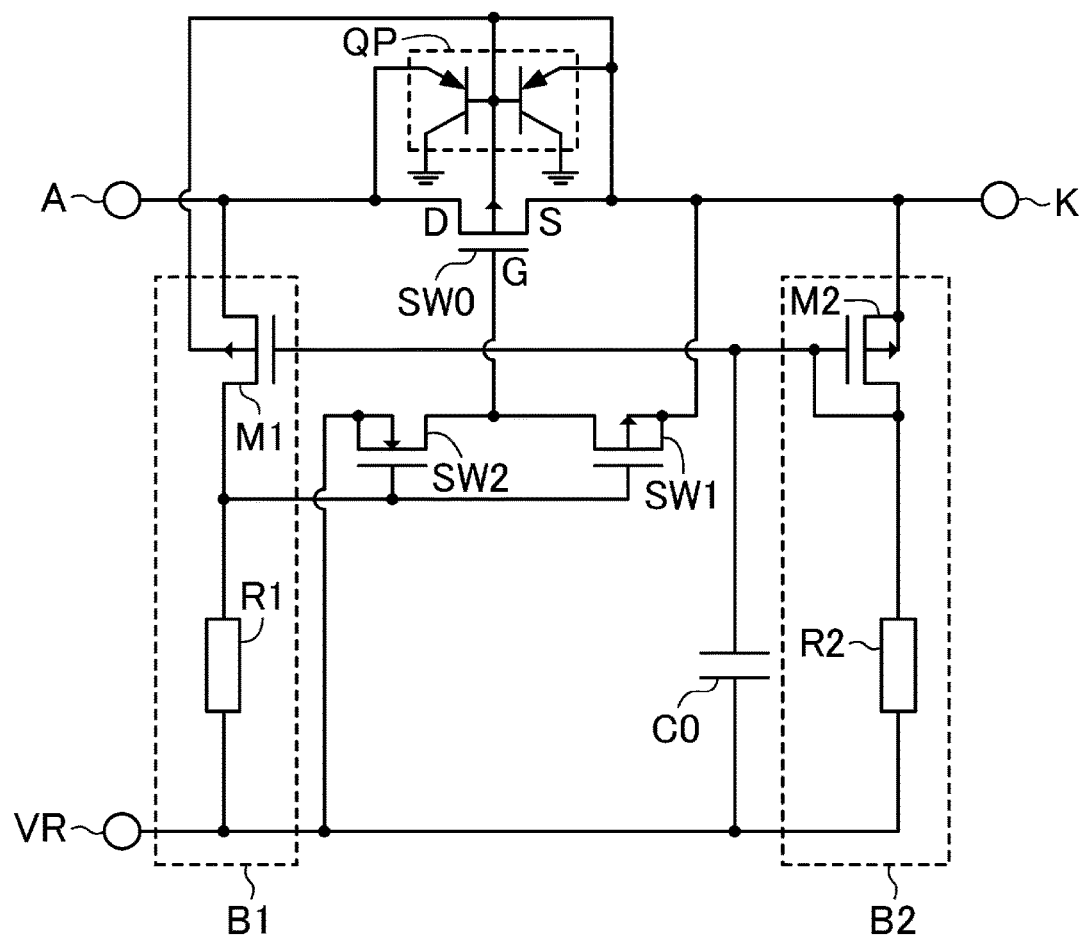
FIG. 2 illustrates an example configuration of a rectifier circuit according to a second exemplary embodiment of the present disclosure.

FIG. 2 illustrates an example configuration of a rectifier circuit according to a second exemplary embodiment of the present disclosure. The rectifier circuit of FIG. 2 includes three terminals A, K, VR, and is formed of P-channel MOS transistor SW0 as a current switching unit, voltage comparator B1, and reference voltage generator B2. P-channel MOS transistor SW1 operating as a switch is connected between a source and a gate of P-channel MOS transistor SW0, and N-channel MOS transistor SW2 operating as a switch is connected between the gate of P-channel MOS transistor SW0 and terminal VR. A back gate of P-channel MOS transistor SW0 is connected to the source. QP indicates a parasitic bipolar transistor incorporated inside P-channel MOS transistor SW0.

Reference voltage generator B2 is formed of P-channel MOS transistor M2 in which a gate and a drain are commonly connected, and resistor R2. Resistor R2 is connected between terminal VII and the drain of P-channel MOS transistor M2. Terminal K is connected to a source of P-channel MOS transistor M2. The drain of P-channel MOS transistor M2 is an output terminal. Capacitor C0 is connected between the output terminal and terminal VR. Voltage comparator B1 is formed of P-channel MOS transistor M1 and resistor R1. Terminal A as a positive input terminal is connected to a source of P-channel MOS transistor M1. A negative input terminal, to which the output terminal of reference voltage generator B2 is connected, is connected to a gate of N-channel MOS transistor M1. The output terminal commonly connected to gates of P-channel MOS transistor SW1 and N-channel MOS transistor SW2 is connected to a drain of N-channel MOS transistor M1. The drain of P-channel MOS transistor M1 is a comparative output terminal. Resistor R1 is connected between the drain of P-channel MOS transistor M1 and terminal VR.

An operation of the rectifier circuit of FIG. 2 will now be described. An effective DC voltage is applied between terminal K and terminal VR, and an AC voltage is applied to terminal A. A voltage across terminal VR is set to be less than a voltage across terminal K so that P-channel MOS transistor M2 can operate. Reference voltage generator B2 outputs a voltage Vpk−Vgsp2, that is, a voltage less than voltage Vpk across terminal K by voltage Vgsp2 between the gate and the source of P-channel MOS transistor M2. The output voltage from reference voltage generator B2 is input to the negative input terminal of voltage comparator B1. In the case where a threshold voltage of P-channel MOS transistor M1 is set to Vtp1, when AC voltage Vpa across terminal A is greater than Vpk−Vgsp2+Vtp1, P-channel MOS transistor M1 is brought into a conductive state, and an amount of a current flowing through resistor R1 increases, so that an output voltage from voltage comparator B1 approaches a voltage across terminal A. Correspondingly, P-channel MOS transistor SW1 is cut off, and N-channel MOS transistor SW2 is brought into a conductive state. This causes P-channel MOS transistor SW0 to be in a conductive state, allowing a current to flow from terminal A to terminal K. At this time, if a voltage drop of P-channel MOS transistor SW0 is greater than a threshold voltage between a base and an emitter of parasitic bipolar transistor QP, a collector current flows through parasitic bipolar transistor QP, resulting in power losses. Therefore, a voltage drop of P-channel MOS transistor SW0 needs to be sufficiently small. Conversely, when AC voltage Vpa across terminal A is less than Vpk−Vgsp2+Vtp1, P-channel MOS transistor M1 is cut off, and an amount of a current flowing through resistor R1 decreases, so that an output voltage from voltage comparator B1 approaches a voltage across terminal VR. Correspondingly, P-channel MOS transistor SW1 is brought into a conductive state, and N-channel MOS transistor SW2 is cut off. This causes P-channel MOS transistor SW0 to be cut off, interrupting a current flowing from terminal K to terminal A. At this time, a forward voltage is not applied to a voltage between the base and the emitter of parasitic bipolar transistor QP, and thus power losses due to a collector current are negligible.

The higher a frequency of an AC voltage across terminal A is, the larger a charge-discharge current that flows to the gate of P-channel MOS transistor M1 when P-channel MOS transistor M1 is switched. The charge-discharge current is supplied from capacitor C0, enabling a high-speed switching of P-channel MOS transistor M1 and thus enabling the rectifier circuit to operate at high frequencies. Although capacitor C0 of FIG. 2 is connected between an output of reference voltage generator B2 and terminal VR, a similar effect can be achieved by connecting capacitor C0 between the output of reference voltage generator B2 and terminal K. If a parasitic capacitance to be added to the output of reference voltage generator B2 is sufficiently large, the parasitic capacitance arising from, for example, the gate of P-channel MOS transistor M2, capacitor C0 is not necessarily required.

As described above, the configuration of the rectifier circuit of FIG. 2 enables the rectifier circuit to operate at high frequencies. However, depending on gate lengths and gate widths of P-channel MOS transistors M1, M2, a variation in a threshold voltage of voltage comparator B1 increases, which may result in power losses due to a reverse current flowing from terminal K to terminal A. In that case, a ratio of the gate width to the gate length of P-channel MOS transistor M1 is selected to be effectively lower than a ratio of the gate width to the gate length of P-channel MOS transistor M2. Accordingly, occurrence of a reverse current is prevented by adjusting P-channel MOS transistor SW0 to be in a conductive state when a voltage across terminal A increases by greater than fixed offset voltage Vofs relative to a voltage across terminal K and selecting offset voltage Vofs to be greater than or equal to a variation in the threshold voltage of voltage comparator B1.

Third Exemplary Embodiment

Figure 3:
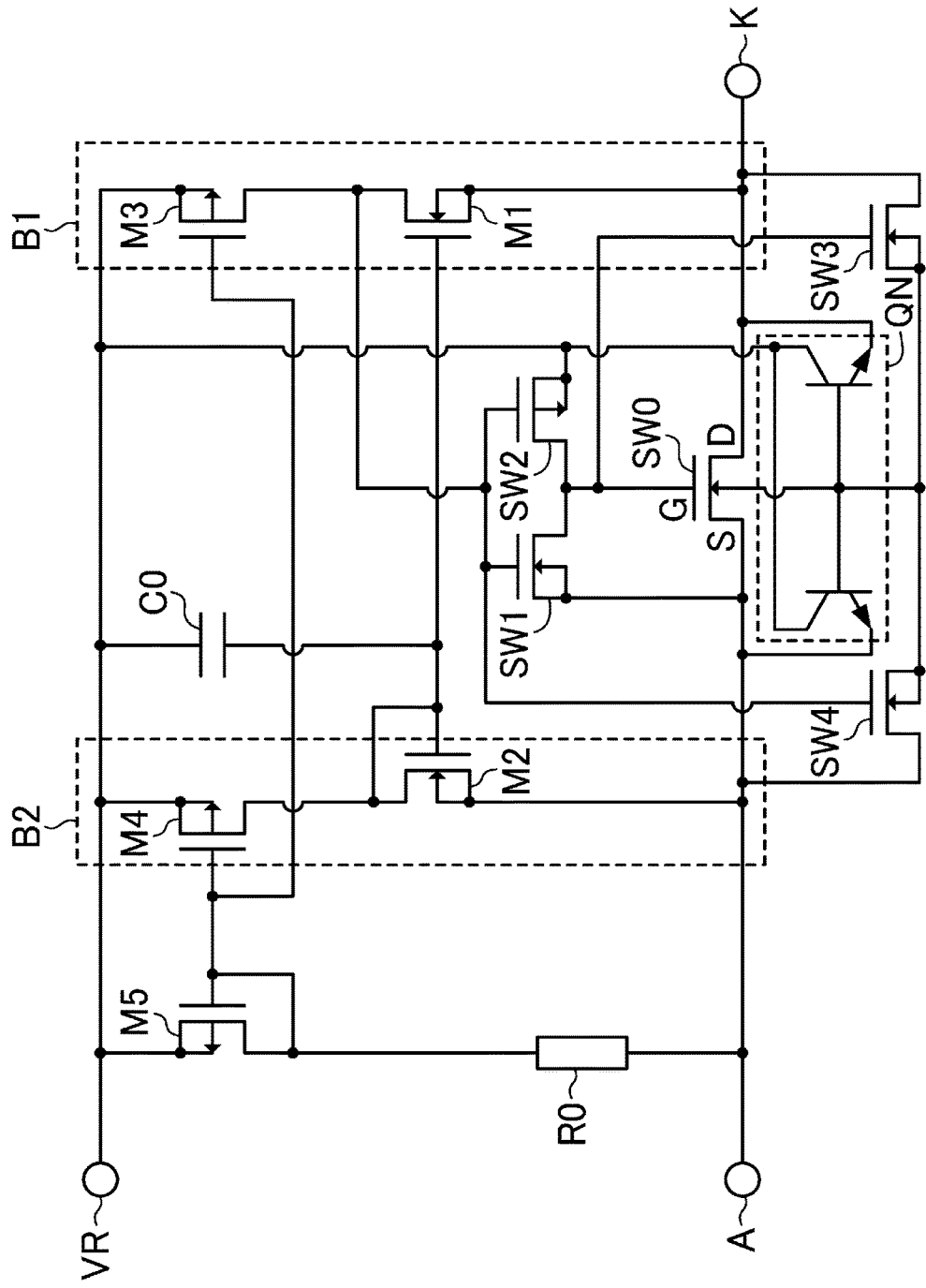
FIG. 3 illustrates an example configuration of a rectifier circuit according to a third exemplary embodiment of the present disclosure.

FIG. 3 illustrates an example configuration of a rectifier circuit according to a third exemplary embodiment of the present disclosure. In the rectifier circuit of FIG. 3, resistor R1 and resistor R2, which are used in the rectifier circuit of FIG. 1, are respectively replaced with P-channel MOS transistors M3 and M4 each operating as a constant current source. The rectifier circuit of FIG. 3 differs from the rectifier circuit of FIG. 1 in that: a drain and a source of N-channel MOS transistor SW4 are respectively connected to a source and a back gate of N-channel MOS transistor SW0; a drain and a source of N-channel MOS transistor SW3 are respectively connected to a drain and the back gate of N-channel MOS transistor SW0; an N-well substrate of N-channel MOS transistor SW0 formed on a triple well is connected to terminal VR; a gate of N-channel MOS transistor SW0 is connected to a gate of N-channel MOS transistor SW3; and a comparative output terminal of voltage comparator B1 is connected to a gate of N-channel MOS transistor SW4. P-channel MOS transistors M3, M4, together with P-channel MOS transistor M5 in which a gate and a drain are commonly connected, constitute a current mirror circuit. A value of a current flowing through P-channel MOS transistor M5 is determined from a voltage difference between terminal VII and terminal A, a voltage between the gate and a source of P-channel MOS transistor M5, and resistor R0 connected between the drain of P-channel MOS transistor M5 and terminal A.

An operation of the rectifier circuit of FIG. 3 will now be described. An effective DC voltage is applied between terminal A and terminal VR, and an AC voltage is applied to terminal K. A voltage across terminal VR is set to be greater than a voltage across terminal A so that N-channel MOS transistor M2 and P-channel MOS transistors M4, M5 can operate. At this time, reference voltage generator B2 outputs a voltage Vpa+Vgsn2, that is, a voltage greater than voltage Vpa across terminal A by voltage Vgsn2 between a gate and a source of N-channel MOS transistor M2. The output voltage from reference voltage generator B2 is input to a negative input terminal of voltage comparator B1. In the case where a threshold voltage of N-channel MOS transistor M1 is set to Vtn1, when AC voltage Vpk across terminal K is greater than Vpa+Vgsn2−Vtn1, N-channel MOS transistor M1 is cut off, causing an output voltage from voltage comparator B1 to be pulled up by P-channel MOS transistor M3, so that the output voltage approaches a voltage across terminal VR. Correspondingly, P-channel MOS transistor SW2 is cut off, and N-channel MOS transistor SW1 is brought into a conductive state. This causes N-channel MOS transistor SW0 to be cut off, interrupting a current flowing from terminal K to terminal A. At this time, N-channel MOS transistor SW4, as well as N-channel MOS transistor SW1, is brought into a conductive state, so that a forward voltage is not applied to a voltage between a base and an emitter of parasitic bipolar transistor QN. Consequently, power losses due to a collector current are negligible. Conversely, when AC voltage Vpk across terminal K is less than Vpa+Vgsn2−Vtn1, N-channel MOS transistor M1 is brought into a conductive state, and when an amount of a drain current flowing through M1 exceeds a predetermined constant current value of P-channel MOS transistor M3, an output voltage from voltage comparator B1 approaches a voltage across terminal K. Correspondingly, P-channel MOS transistor SW2 is brought into a conductive state, and N-channel MOS transistor SW1 is cut off. This causes N-channel MOS transistor SW0 to be in a conductive state, allowing a current to flow from terminal A to terminal K. At this time, N-channel MOS transistor SW3, as well as N-channel MOS transistor SW0, is brought into a conductive state, so that a forward voltage is not applied to a voltage between the base and the emitter of parasitic bipolar transistor QN. Consequently, power losses due to a collector current are negligible.

The higher a frequency of an AC voltage across terminal K is, the larger a charge-discharge current that flows to the gate of N-channel MOS transistor M1 when N-channel MOS transistor M1 is switched. The charge-discharge current is supplied from capacitor C0, enabling a high-speed switching of N-channel MOS transistor M1 and thus enabling the rectifier circuit to operate at high frequencies. Although capacitor C0 of FIG. 3 is connected between an output of reference voltage generator B2 and terminal VR, a similar effect can be achieved by connecting capacitor C0 between the output of reference voltage generator B2 and terminal A. If a parasitic capacitance to be added to the output of reference voltage generator B2 is sufficiently large, the parasitic capacitance arising from, for example, a gate of N-channel MOS transistor M2, capacitor C0 is not necessarily required.

The configuration of the rectifier circuit of FIG. 3 has advantages over the configuration of the rectifier circuit of FIG. 1. With the configuration of the rectifier circuit of FIG. 3, a transfer gain of voltage comparator B1 is enhanced by P-channel MOS transistor M3 that operates at a constant current. Consequently, voltage comparator B1 is faster. Additionally, the N-well substrate of N-channel MOS transistor SW0 and a back gate, of a P-channel MOS transistor, connected to terminal VR, can be connected in common, resulting in reduced footprint.

As described above, the configuration of the rectifier circuit of FIG. 3 enables the rectifier circuit to operate at high frequencies. However, depending on gate lengths and gate widths of N-channel MOS transistors M1, M2, a variation in a threshold voltage of voltage comparator B1 increases, which may result in power losses due to a reverse current flowing from terminal K to terminal A. In that case, a ratio of the gate width to the gate length of N-channel MOS transistor M1 is selected to be effectively lower than a ratio of the gate width to the gate length of N-channel MOS transistor M2. Accordingly, occurrence of a reverse current is prevented by adjusting N-channel MOS transistor SW0 to be in a conductive state when a voltage across terminal K decreases by greater than fixed offset voltage Vofs relative to a voltage across terminal A and selecting offset voltage Vofs to be greater than or equal to a variation in the threshold voltage of voltage comparator B1.

With regard to offset voltage Vofs, a similar effect can be achieved by setting the constant current value of P-channel MOS transistor M3 to be greater than a constant current value of P-channel MOS transistor M4, and by adjusting the constant current value of P-channel MOS transistor M3 to coincide with the drain current of P-channel MOS transistor M1 obtained when a voltage across K decreases by voltage Vofs relative to a voltage across terminal A.

Figure 5:
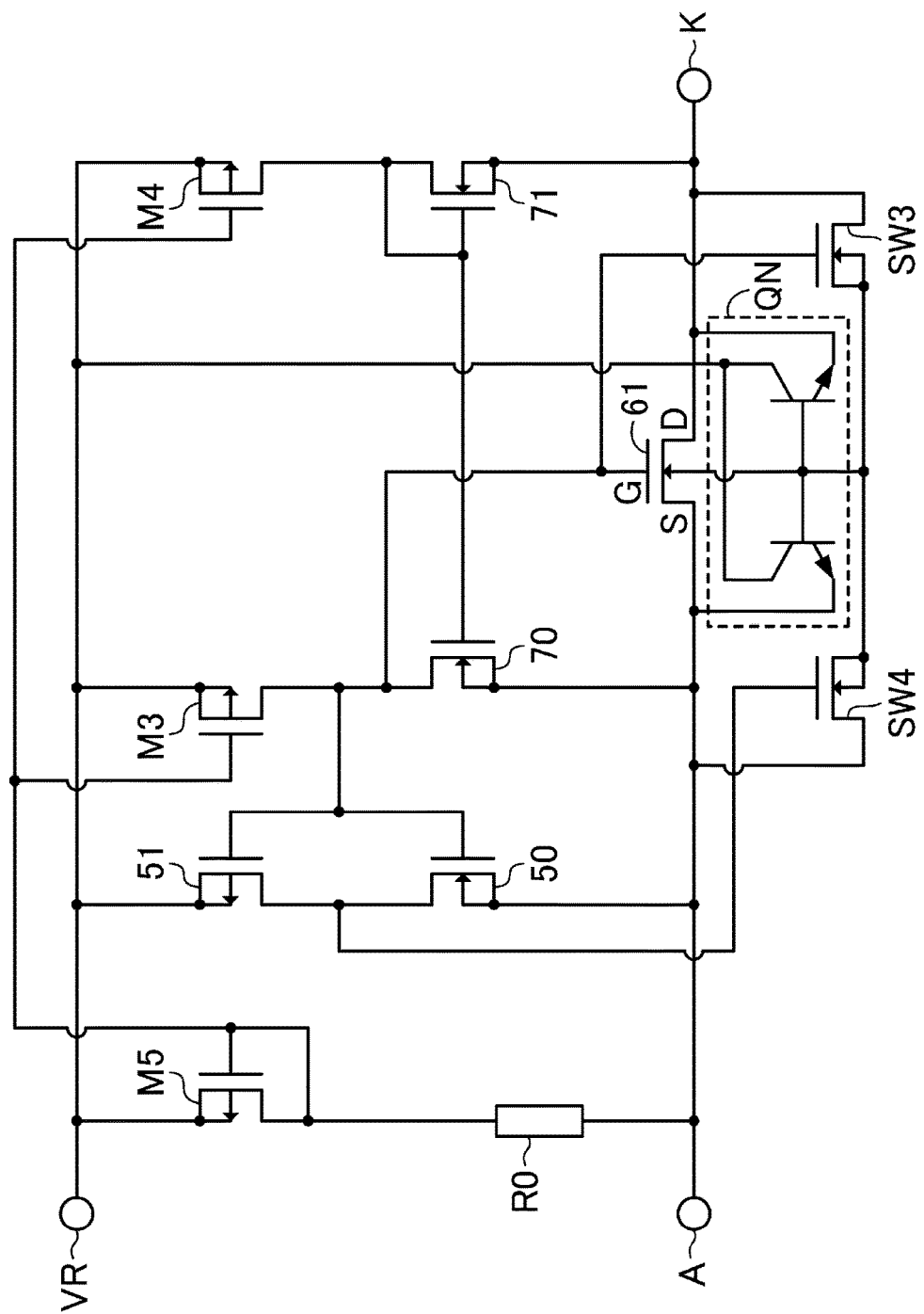
FIG. 5 illustrates a rectifier circuit configured by applying, to a second conventional example, a part of the example configuration according to the third exemplary embodiment of the present disclosure.
Figure 14:
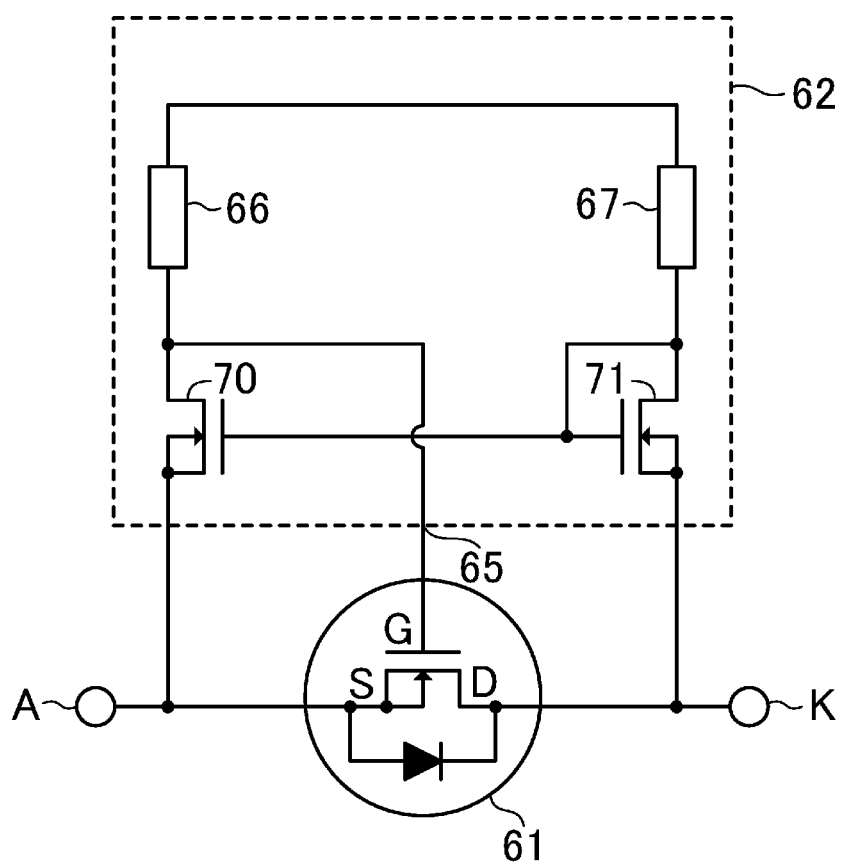
FIG. 14 illustrates a rectifier circuit configured by replacing the bipolar transistors of the rectifier circuit (the second conventional example) with MOS transistors.

By adding N-channel MOS transistor 50 and P-channel MOS transistor 51 to a conventional rectifier circuit of FIG. 14 in which bipolar transistors are replaced with MOS transistors, the modifications in the configuration of the rectifier circuit of FIG. 3 made to the configuration of the rectifier circuit of FIG. 1 can be applied to the rectifier circuit of FIG. 14. FIG. 5 illustrates a configuration of a rectifier circuit configured by adding N-channel MOS transistor 50 and P-channel MOS transistor 51 to the rectifier circuit of FIG. 14. With the configuration illustrated in FIG. 5, resistor R0 is connected to terminal A on the assumption that an AC voltage is applied to terminal K, and that an effective DC voltage is applied to terminal A. However, if an AC signal is applied to terminal A, and an effective DC voltage is applied to terminal K, a connection terminal for resistor R0 is changed from terminal A to terminal K, and then the rectifier circuit of FIG. 5 operates.

Fourth Exemplary Embodiment

Figure 4:
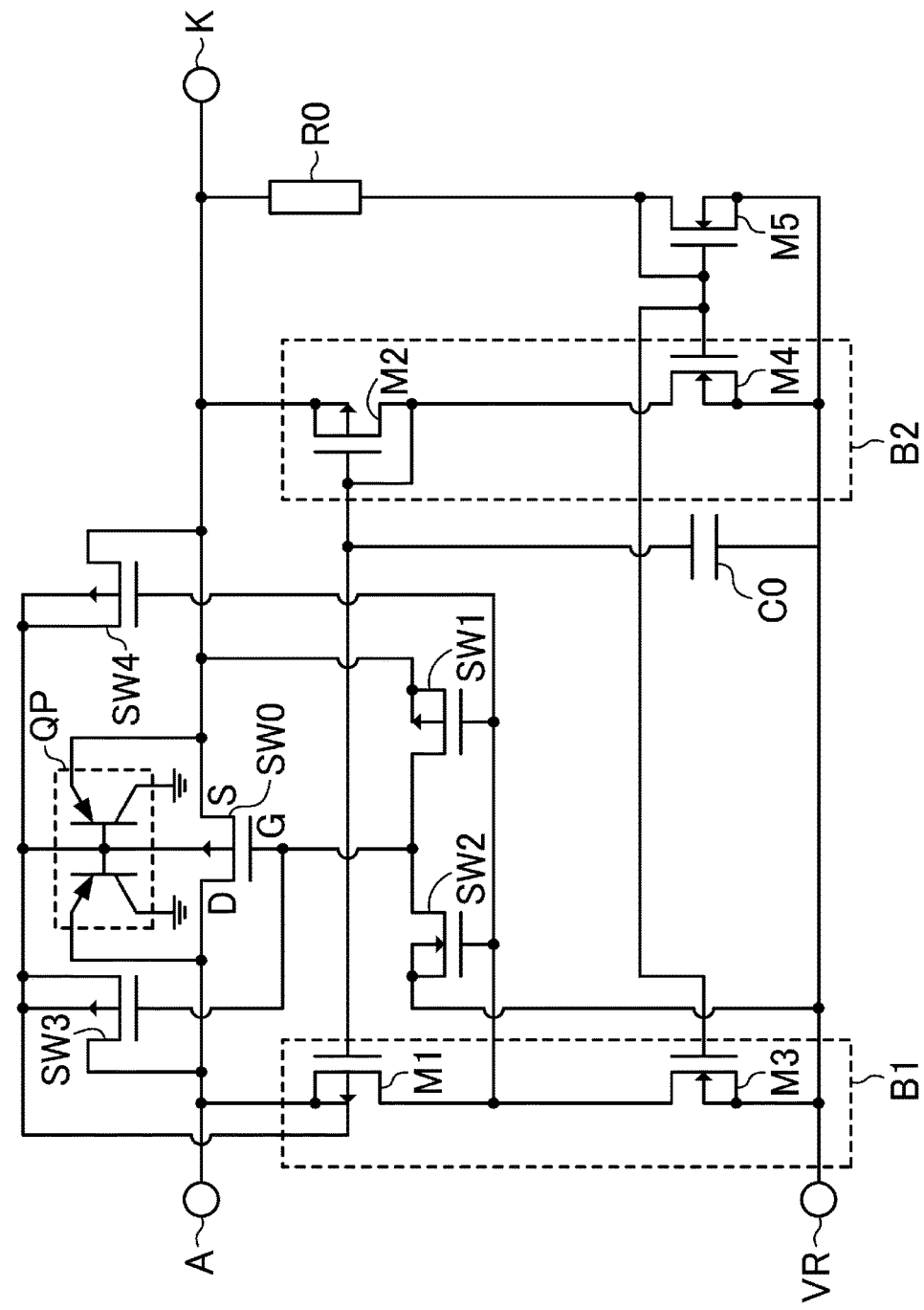
FIG. 4 illustrates an example configuration of a rectifier circuit according to a fourth exemplary embodiment of the present disclosure.

FIG. 4 illustrates an example configuration of a rectifier circuit according to a fourth exemplary embodiment of the present disclosure. In the rectifier circuit of FIG. 4, resistor R1 and resistor R2, which are used in the rectifier circuit of FIG. 2, are respectively replaced with N-channel MOS transistors M3 and M4 each operating as a constant current source. Specifically, the rectifier circuit of FIG. 4 differs from the rectifier circuit of FIG. 2 in that: a drain and a source of P-channel MOS transistor SW4 are respectively connected to a source and a back gate of P-channel MOS transistor SW0; a drain and a source of P-channel MOS transistor SW3 are respectively connected to a drain and the back gate of P-channel MOS transistor SW0; a gate of P-channel MOS transistor SW0 is connected to a gate of P-channel MOS transistor SW3; and an output terminal of voltage comparator B1 is connected to a gate of P-channel MOS transistor SW4. N-channel MOS transistors M3, M4, together with N-channel MOS transistor M5, in which a gate and a drain are commonly connected, constitute a current mirror circuit such that a value of a current flowing through N-channel MOS transistor M5 is determined from a voltage difference between terminal VII and terminal A, a voltage between a gate and a source of P-channel MOS transistor M5, and resistor R0 connected between a drain of N-channel MOS transistor M5 and terminal K.

An operation of the rectifier circuit of FIG. 4 will now be described. An effective DC voltage is applied between terminal K and terminal VR, and an AC voltage is applied to terminal A. A voltage across terminal VR is set to be less than a voltage across terminal K so that P-channel MOS transistor M2 and N-channel MOS transistors M4, M5 can operate. At this time, reference voltage generator B2 outputs a voltage Vpk−Vgsp2, that is, a voltage less than voltage Vpk across terminal K by voltage Vgsp2 between a gate and a source of P-channel MOS transistor M2. The output voltage from reference voltage generator B2 is input to a negative input terminal of voltage comparator B1. In the case where a threshold voltage of P-channel MOS transistor M1 is set to Vtp1, when AC voltage Vpa across terminal A is greater than Vpk−Vgsp2+Vtp1, P-channel MOS transistor M1 is brought into a conductive state. With this configuration, when an amount of a drain current flowing through P-channel MOS transistor M1 exceeds a predetermined constant current value of N-channel MOS transistor M3, an output voltage from voltage comparator B1 approaches a voltage across terminal A. Correspondingly, P-channel MOS transistor SW1 is cut off, and N-channel MOS transistor SW2 is brought into a conductive state. This causes P-channel MOS transistor SW0 to be in a conductive state, allowing a current to flow from terminal A to terminal K. At this time, P-channel MOS transistor SW3, as well as P-channel MOS transistor SW0, is brought into a conductive state, so that a forward voltage is not applied between a base and an emitter of parasitic bipolar transistor QP. Consequently, power losses due to a collector current are negligible. Conversely, when AC voltage Vpa across terminal A is less than Vpk−Vgsp2+Vtp1, P-channel MOS transistor M1 is cut off. This causes N-channel MOS transistor M3 to pull down an output voltage of voltage comparator B1, so that the output voltage of voltage comparator B1 approaches a voltage across terminal VR. Correspondingly, P-channel MOS transistor SW1 is brought into a conductive state, and N-channel MOS transistor SW2 is cut off. This causes P-channel MOS transistor SW0 to be cut off, interrupting a current flowing from terminal K to terminal A. At this time, P-channel MOS transistor SW4, as well as P-channel MOS transistor SW1, is brought into a conductive state, so that a forward voltage is not applied between the base and the emitter of parasitic bipolar transistor QP. Consequently, power losses due to a collector current are negligible.

The higher a frequency of an AC voltage across terminal A is, the larger a charge-discharge current that flows to the gate of P-channel MOS transistor M1 when P-channel MOS transistor M1 is switched. The charge-discharge current is supplied from capacitor C0, enabling a high-speed switching of P-channel MOS transistor M1 and thus enabling the rectifier circuit to operate at high frequencies. Although capacitor C0 of FIG. 4 is connected between an output of reference voltage generator B2 and terminal VR, a similar effect can be achieved by connecting capacitor C0 between the output of reference voltage generator B2 and terminal K. If a parasitic capacitance to be added to the output of reference voltage generator B2 is sufficiently large, the parasitic capacitance arising from, for example, the gate of P-channel MOS transistor M2, capacitor C0 is not necessarily required.

The configuration of the rectifier circuit of FIG. 2 has advantages over the configuration of the rectifier circuit of FIG. 4. With the configuration of the rectifier circuit of FIG. 4, a transfer gain of voltage comparator B1 is enhanced by N-channel MOS transistor M3 that operates at a constant current. Consequently, voltage comparator B1 is faster. When P-channel MOS transistor SW0 is brought into a conductive state, P-channel MOS transistor SW3 is also brought into a conductive state, so that a forward voltage is not applied between the base and the emitter of parasitic bipolar transistor QP. Consequently, power losses due to a collector current are negligible even when a voltage drop of P-channel MOS transistor SW0 is large.

As described above, the configuration of the rectifier circuit of FIG. 4 enables the rectifier circuit to operate at high frequencies. However, depending on gate lengths and gate widths of P-channel MOS transistors M1, M2, a variation in a threshold voltage of voltage comparator B1 increases, which may result in power losses due to a reverse current flowing from terminal K to terminal A. In that case, a ratio of the gate width to the gate length of P-channel MOS transistor M1 is selected to be effectively lower than a ratio of the gate width to the gate length of P-channel MOS transistor M2. Accordingly, occurrence of a reverse current is prevented by adjusting P-channel MOS transistor SW0 to be in a conductive state when a voltage across terminal A increases by greater than fixed offset voltage Vofs relative to a voltage across terminal K and selecting offset voltage Vofs to be greater than or equal to a variation in the threshold voltage of voltage comparator B1.

With regard to offset voltage Vofs, a similar effect can be achieved by setting the constant current value of N-channel MOS transistor M3 to be greater than a constant current value of N-channel MOS transistor M4, and by adjusting the constant current value of P-channel MOS transistor M3 to coincide with a drain current of P-channel MOS transistor M1 obtained when a voltage across terminal K increases by offset voltage Vofs relative to a voltage across terminal A.

Figure 6:
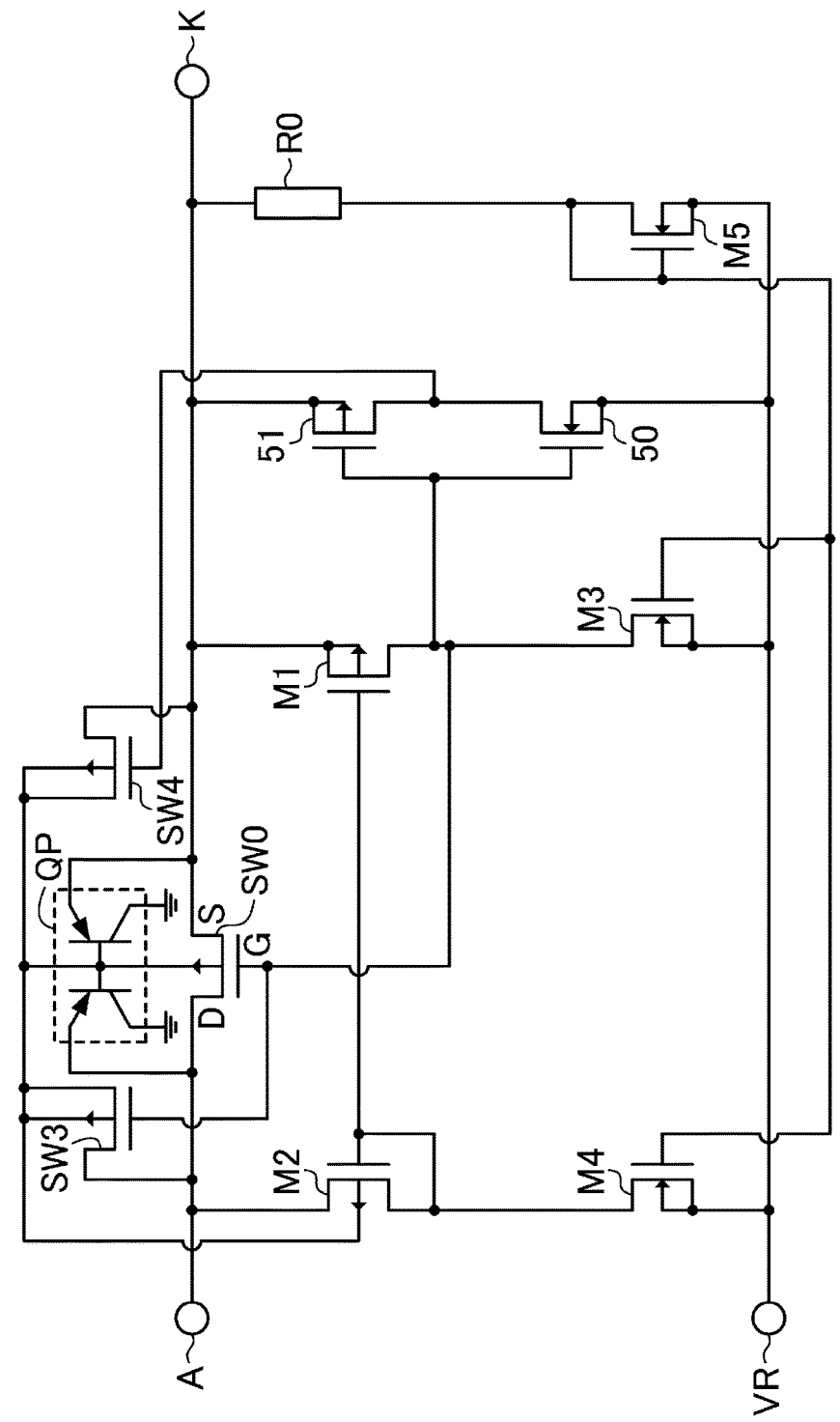
FIG. 6 illustrates a rectifier circuit configured by applying, to the second conventional example, a part of the example configuration according to the fourth exemplary embodiment of the present disclosure.

By adding N-channel MOS transistor 50 and P-channel MOS transistor 51 to the conventional rectifier circuit of FIG. 14, in which bipolar transistors are replaced with MOS transistors, with an N-channel MOS transistor of the conventional rectifier circuit replaced with a P-channel MOS transistor, modifications in the configuration of the rectifier circuit of FIG. 4 made to the configuration of the rectifier circuit of FIG. 2 can be applied to the rectifier circuit of FIG. 14. FIG. 6 illustrates a configuration of a rectifier circuit configured by adding N-channel MOS transistor 50 and P-channel MOS transistor 51 to the conventional rectifier circuit of the configuration. With the configuration illustrated in FIG. 6, resistor R0 is connected to terminal K on the assumption that an AC voltage is applied to terminal A, and that an effective DC voltage is applied to terminal K. However, if an AC signal is applied to terminal K, and an effective DC voltage is applied to terminal A, a connection terminal for resistor R0 is changed from terminal K to terminal A, and then the rectifier circuit of FIG. 6 operates.

Fifth Exemplary Embodiment

Figure 7:
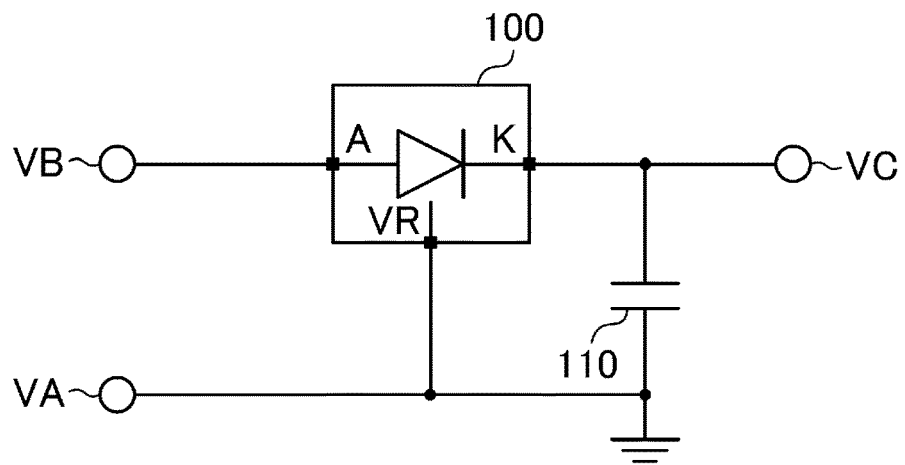
FIG. 7 illustrates an example of a half-wave rectifier according to a fifth exemplary embodiment of the present disclosure.

FIG. 7 illustrates an example configuration of a half-wave rectifier according to a fifth exemplary embodiment of the present disclosure. The half-wave rectifier illustrated in FIG. 7 includes two input terminals VA, VB, and one output terminal VC, and is formed of rectifier circuit 100 of the present disclosure and smoothening capacitor 110. Any one of the configurations of FIGS. 2, 4, and 6 can be applied to rectifier circuit 100. Terminal A, terminal K, and terminal VR of rectifier circuit 100 are respectively connected to input terminal VB, output terminal VC, and a ground terminal. Smoothening capacitor 110 is connected between output terminal VC and the ground terminal.

When a voltage across input terminal VB is greater than a voltage across output terminal VC after an AC voltage is applied between input terminals VA and VB, a current flows from terminal A to terminal K of rectifier circuit 100, causing an electrical charge to accumulate in smoothening capacitor 110. Conversely, when a voltage across input terminal VB is less than a voltage across output terminal VC, a current flowing from terminal K to terminal A of rectifier circuit 100 is interrupted, so that the electrical charge accumulated in smoothening capacitor 110 is retained, and an effective DC voltage is output to output terminal VC.

As described above, the rectifier circuit of the present disclosure can operate at high frequencies and has small power losses. Accordingly, applying rectifier circuit 100 of the present disclosure to a half-wave rectifier enables the half-wave rectifier to operate at high frequencies and to be highly efficient.

Sixth Exemplary Embodiment

Figure 8:
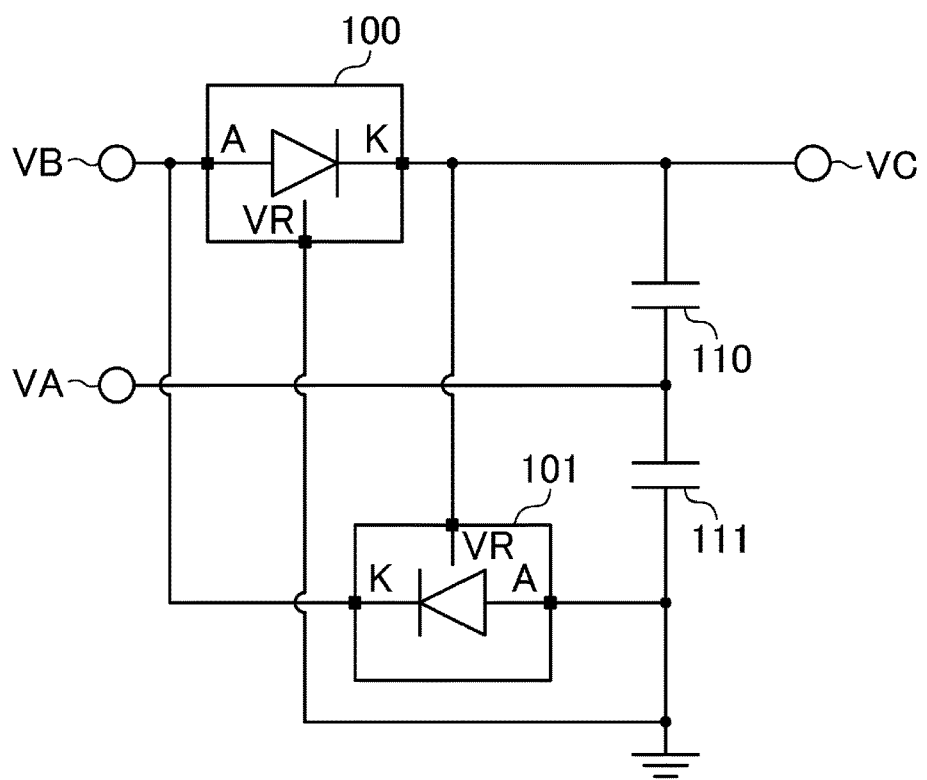
FIG. 8 illustrates an example of a multiplying rectifier according to a sixth exemplary embodiment of the present disclosure.

FIG. 8 illustrates an example configuration of a multiplying rectifier according to a sixth exemplary embodiment of the present disclosure. The multiplying rectifier illustrated in FIG. 8 includes two input terminals VA, VB, and one output terminal VC, and is formed of rectifier circuits 100, 101 of the present disclosure and smoothening capacitors 110, 111. Any one of the configurations of FIGS. 2, 4, and 6 can be applied to rectifier circuit 100, and any one of the configurations of FIGS. 1, 3, and 5 can be applied to rectifier circuit 101. Terminal A, terminal K, and terminal VR of rectifier circuit 100 are respectively connected to input terminal VB, output terminal VC, and a ground terminal. Terminal A, terminal K, and terminal VR of rectifier circuit 101 are respectively connected to the ground terminal, input terminal VB, and output terminal VC. Smoothening capacitor 110 is connected between output terminal VC and input terminal VA, while smoothening capacitor 111 is connected between input terminal VA and the ground terminal.

When a voltage across input terminal VB is greater than a voltage across output terminal VC after an AC voltage is applied between input terminals VA and VB, rectifier circuit 100 is brought into a conductive state, allowing a current to flow from input terminal VB to input terminal VA, which causes an electrical charge to accumulate in smoothening capacitor 110. Conversely, when a voltage across input terminal VB is less than a voltage across output terminal VC, rectifier circuit 100 is cut off, so that the electrical charge accumulated in smoothening capacitor 110 is retained. When a voltage across input terminal VB decreases to be less than a ground potential, rectifier circuit 101 is brought into a conductive state, allowing a current to flow from input terminal VA to input terminal VB, which causes an electrical charge to accumulate in smoothening capacitor 111. When a voltage across input terminal VB is greater than the ground potential, rectifier circuit 101 is cut off, and the electrical charge accumulated in smoothening capacitor 111 is retained. As a result of the above operation, effective DC voltages across smoothening capacitors 110 and 111 are output in series to output terminal VC, whereby a high DC voltage is obtained.

As described above, the rectifier circuit of the present disclosure can operate at high frequencies and has small power losses. Accordingly, applying rectifier circuits 100, 101 of the present disclosure to a multiplying rectifier enables the multiplying rectifier to operate at high frequencies and to be highly efficient.

Seventh Exemplary Embodiment

Figure 9:
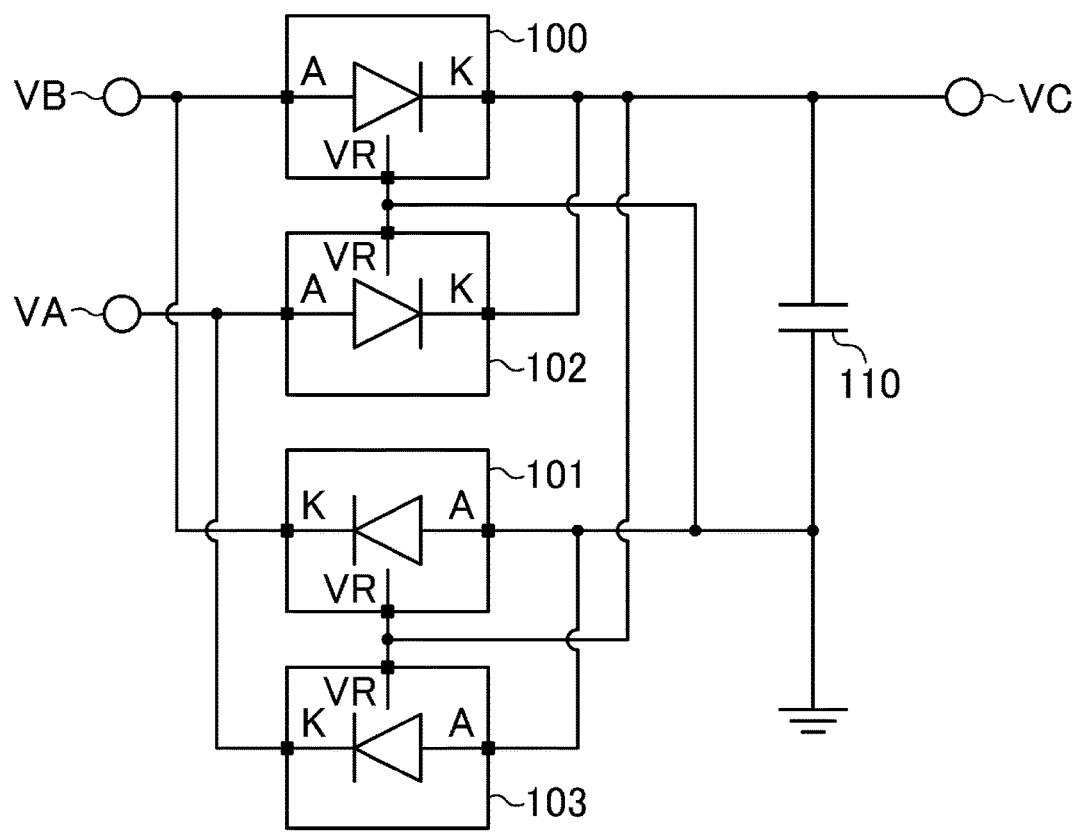
FIG. 9 illustrates an example of a full-wave rectifier according to a seventh exemplary embodiment of the present disclosure.

FIG. 9 illustrates an example configuration of a full-wave rectifier according to a seventh exemplary embodiment of the present disclosure. The full-wave rectifier illustrated in FIG. 9 includes two input terminals VA, VB, and one output terminal VC, and is formed of rectifier circuits 100, 101, 102, and 103 of the present disclosure and smoothening capacitor 110. Any one of the configurations of FIGS. 2, 4, and 6 can be applied to rectifier circuits 100 and 102, and any one of the configurations of FIGS. 1, 3, and 5 can be applied to rectifier circuits 101 and 103. Terminal A, terminal K, and terminal VR of rectifier circuit 100 are respectively connected to input terminal VB, output terminal VC, and a ground terminal. Terminal A, terminal K, and terminal VR of rectifier circuit 101 are respectively connected to the ground terminal, input terminal VB, and output terminal VC. Likewise, terminal A, terminal K, and terminal VR of rectifier circuit 102 are respectively connected to input terminal VA, output terminal VC, and the ground terminal. Terminal A, terminal K, and terminal VR of rectifier circuit 103 are respectively connected to the ground terminal, input terminal VA, and output terminal VC. Smoothening capacitor 110 is connected between output terminal VC and the ground terminal.

When a voltage across input terminal VB is greater than a voltage across output terminal VC and a voltage across input terminal VA is less than a ground potential after an AC voltage is applied between input terminals VA and VB, rectifier circuits 100 and 103 are brought into the conductive state, allowing a current to flow from input terminal VB to input terminal VA, which causes an electrical charge to accumulate in smoothening capacitor 110. At this time, rectifier circuits 101 and 102 are cut off. Conversely, when a voltage across input terminal VB is less than the ground potential, and a voltage across input terminal VA is greater than a voltage across output terminal VC, rectifier circuits 101 and 102 are brought into the conductive state, allowing a current to flow from input terminal VA to input terminal VB, which causes an electrical charge to accumulate in smoothening capacitor 110. At this time, rectifier circuits 100 and 103 are cut off. As a result of the above operation, an effective DC voltage across smoothening capacitor 110 can be obtained from output terminal VC.

Figure 10:
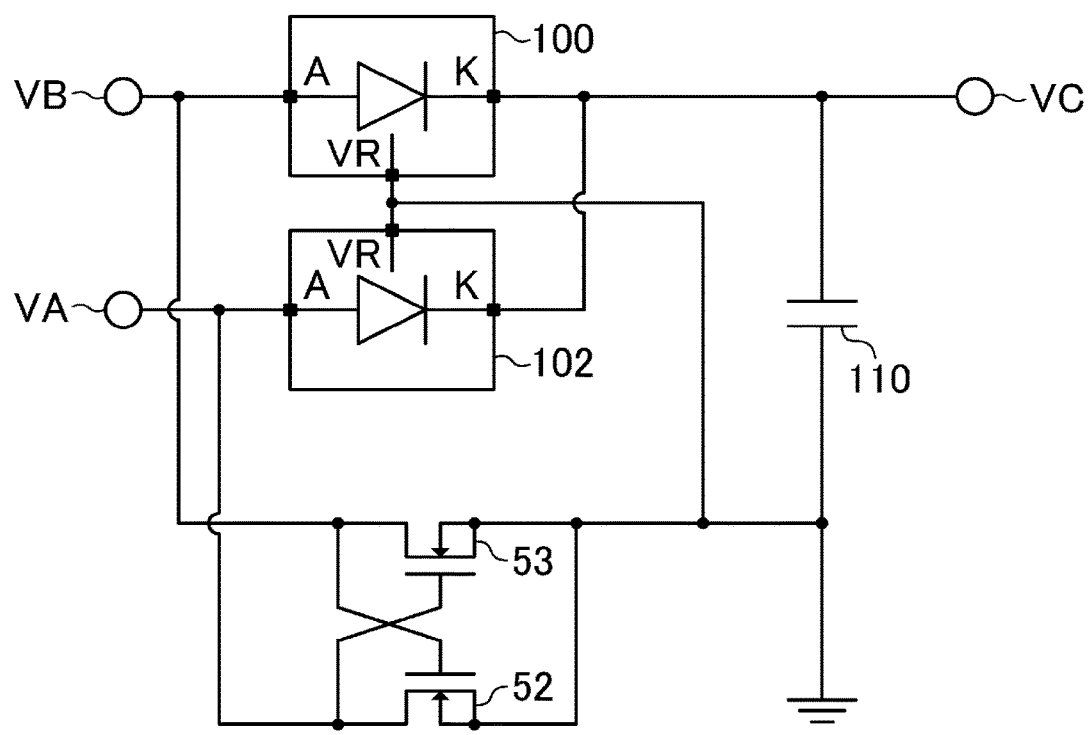
FIG. 10 illustrates another example of the full-wave rectifier according to the seventh exemplary embodiment of the present disclosure.

As illustrated in FIG. 10, replacing rectifier circuit 101 and rectifier circuit 103 of the full-wave rectifier according to the seventh exemplary embodiment of the present disclosure with N-channel MOS transistor 53 and N-channel MOS transistor 52, respectively, achieves an operation similar to the operation of the full-wave rectifier according to the seventh exemplary embodiment of the present disclosure.

As described above, the rectifier circuit of the present disclosure can operate at high frequencies and has small power losses. Accordingly, applying the rectifier circuit of the present disclosure to a full-wave rectifier enables the full-wave rectifier to operate at high frequencies and to be highly efficient.

Eighth Exemplary Embodiment

Figure 11:
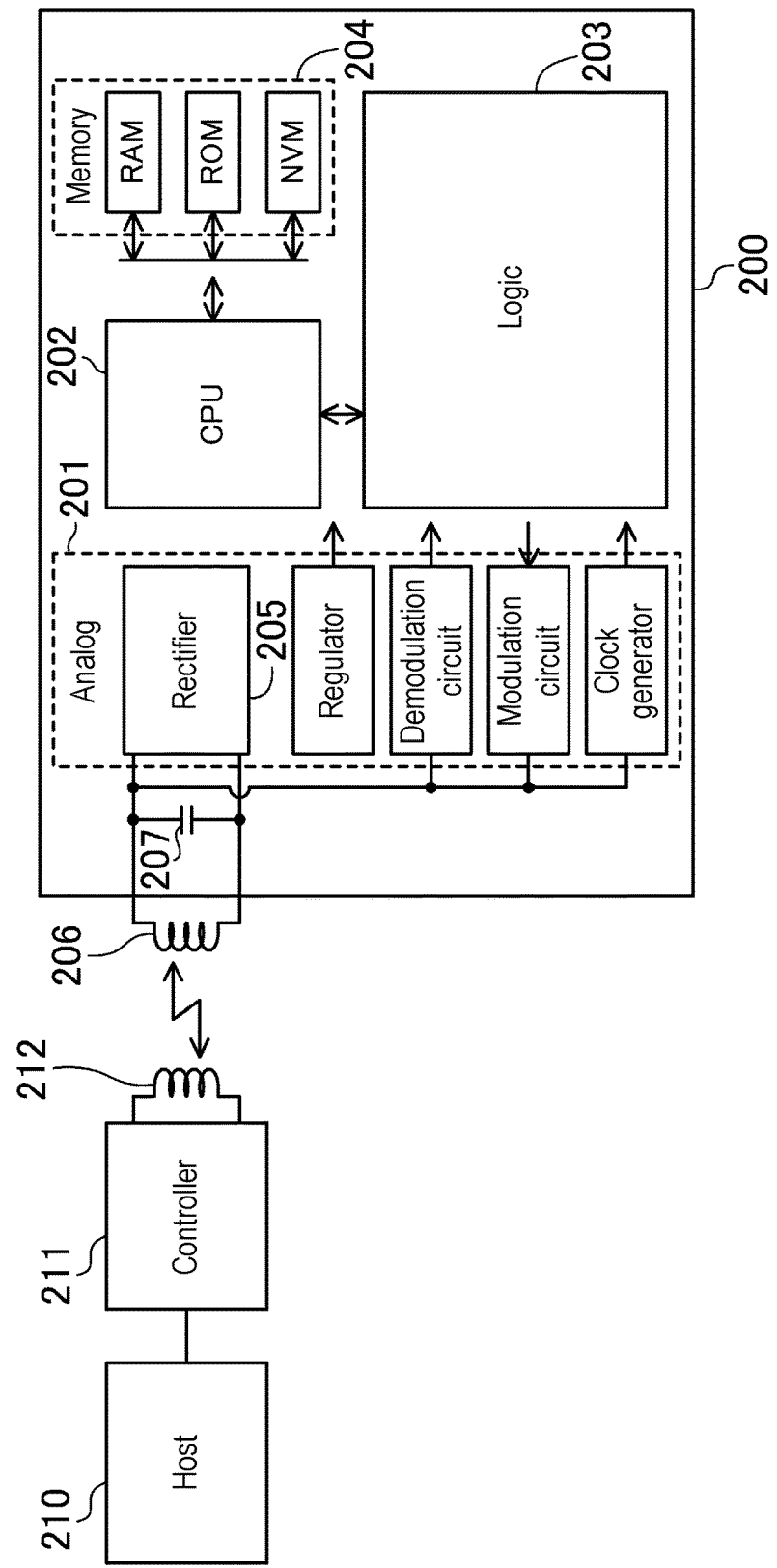
FIG. 11 illustrates an example of a contactless power supply device according to an eighth exemplary embodiment of the present disclosure.
Figure 12:
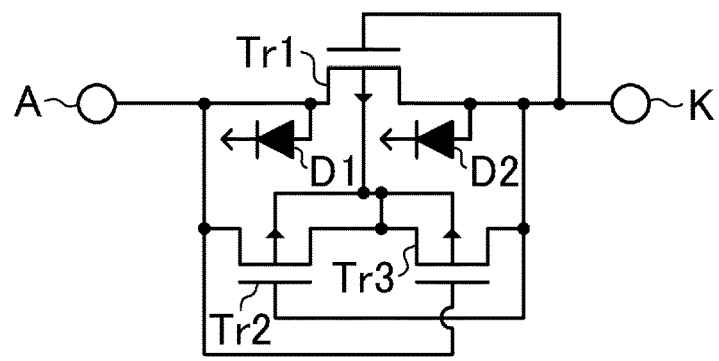
FIG. 12 illustrates, as a first conventional example, a rectifier circuit in which MOS transistors are used.
Figure 13:
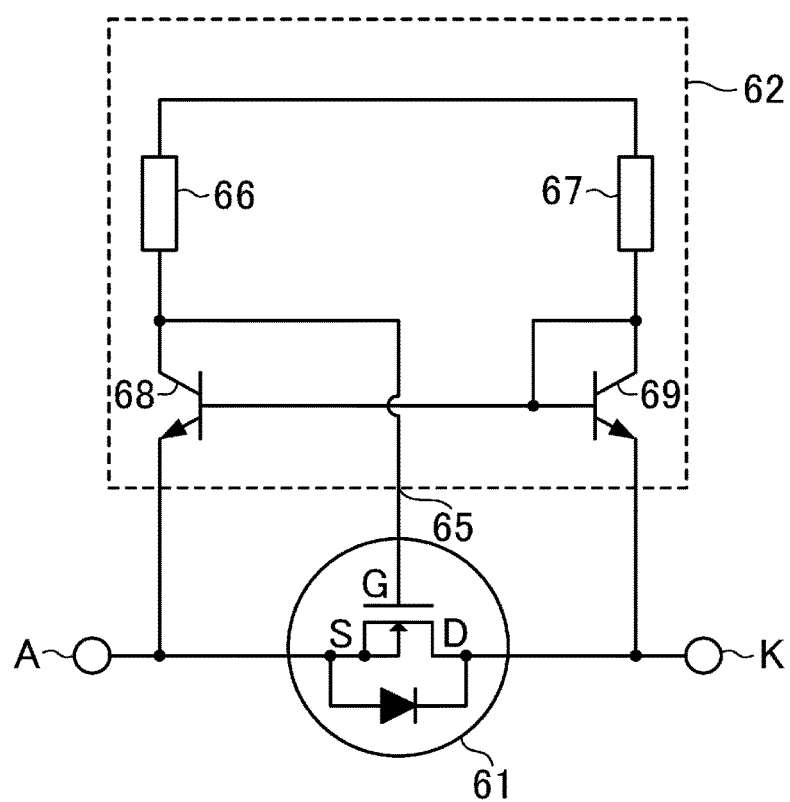
FIG. 13 illustrates, as a second conventional example, a rectifier circuit in which a MOS transistor and bipolar transistors are used.

FIG. 11 illustrates a contactless power supply for an smart card as an example of a contactless power supply device according to an eighth exemplary embodiment of the present disclosure. A contactless smart card incorporates IC chip 200 and antenna 206, and communicates with host computer 210 via controller 211 and antenna 212. For a command and data to be transmitted from host computer 210, controller 211 encodes and modulates the command and the data, superimposes information on a carrier, and radiates an electromagnetic field from antenna 212. Antenna 206 of the contactless smart card is adjusted by tuning capacitor 207 to be able to receive a carrier frequency easily. Upon reception of the electromagnetic field, rectifier 205 in analog circuit 201 included in IC chip 200 converts an AC voltage of the carrier to an effective DC voltage, and supplies, via a regulator circuit in analog circuit 201, a DC power source to logic circuit 203, CPU 202, and memory circuit 204. The command and the data from host computer 210 which have been superimposed on the carrier are retrieved from the carrier by a demodulation circuit in analog circuit 201. After being decoded by logic circuit 203, the command and the data are transferred to CPU 202. Based on the command and the data, CPU 202, for example, executes a program recorded on memory circuit 204 and writes and reads the data. Then, CPU 202 transfers, to logic circuit 203, a response to host computer 210. Logic circuit 203 encodes the response to host computer 210, varies a carrier amplitude via a load modulation circuit in analog circuit 201, and transfers the response to antenna 212. The response transferred to antenna 212 is demodulated and decoded by controller 211 and transferred to host computer 210.

Applying the rectifier circuit of the present disclosure to rectifier 205 of FIG. 11 reduces an amount of power consumed by the rectifier circuit. Therefore, enabling CPU 202 to operate at high speeds and increasing a speed of access to memory circuit 204 do not increase an amount of power consumed by overall IC chip 200, thus enabling a contactless smart card which is faster and which operates at low power.

The rectifier circuit of the present disclosure is applicable to a contactless power supply device, typified by a contactless smart card and an RFID tag, and to products that generate a DC power source from an AC voltage.

What is claimed is:
1. A rectifier circuit comprising:
a first terminal;
a second terminal; and
a third terminal,
wherein the rectifier circuit configured to allow a current to flow in a direction from the first terminal to the second terminal, and to interrupt a reverse current flowing from the second terminal to the first terminal,
a voltage across the third terminal is set to be greater than a voltage across the first terminal,
the rectifier circuit further comprises:
a voltage comparator including a positive input terminal, a negative input terminal, and a comparative output terminal;
a current switching unit including a source terminal, a drain terminal, and a control terminal;
a first switching unit that conducts or cuts off between the source terminal and the control terminal of the current switching unit;
a second switching unit that conducts or cuts off between the control terminal of the current switching unit and the third terminal; and
a reference voltage generator that uses the first terminal and the third terminal as input terminals, and includes a voltage output terminal,
the voltage output terminal of the reference voltage generator is connected to the negative input terminal of the voltage comparator,
the second terminal is connected to the positive input terminal of the voltage comparator,
the comparative output terminal of the voltage comparator is connected to the first switching unit and the second switching unit, and
when a difference in voltage between the positive input terminal and the negative input terminal of the voltage comparator is greater than a threshold, the rectifier circuit causes the first switching unit to be in a conductive state, and causes the second switching unit to be cut off, so that the current switching unit is cut off, and
when the difference in voltage between the positive input terminal and the negative input terminal of the voltage comparator is less than the threshold, the rectifier circuit causes the first switching unit to be cut off, and causes the second switching unit to be in a conductive state, so that the current switching unit is brought into a conductive state.
2. A rectifier circuit comprising:
a first terminal;
a second terminal; and
a third terminal, wherein the rectifier circuit configured to allow a current to flow in a direction from the first terminal to the second terminal, and to interrupt a reverse current flowing from the second terminal to the first terminal, a voltage across the third terminal is set to be less than a voltage across the second terminal, the rectifier circuit further comprises:

a voltage comparator including a positive input terminal, a negative input terminal, and a comparative output terminal;

a current switching unit including a source terminal, a drain terminal, and a control terminal;

a first switching unit that conducts or cuts off between the source terminal and the control terminal of the current switching unit;

a second switching unit that conducts or cuts off between the control terminal of the current switching unit and the third terminal; and a reference voltage generator that uses the second terminal and the third terminal as input terminals, and includes a voltage output terminal, the voltage output terminal of the reference voltage generator is connected to the negative input terminal of the voltage comparator, the first terminal is connected to the positive input terminal of the voltage comparator, the comparative output terminal of the voltage comparator is connected to the first switching unit and the second switching unit, and when a difference in voltage between the positive input terminal and the negative input terminal of the voltage comparator is greater than a threshold, the rectifier circuit causes the first switching unit to be cut off, and causes the second switching unit to be in a conductive state, so that the current switching unit is brought into a conductive state, and when the difference in voltage between the positive input terminal and the negative input terminal of the voltage comparator is less than the threshold, the rectifier circuit causes the first switching unit to be in a conductive state, and causes the second switching unit to be cut off, so that the current switching unit is cut off.

3. The rectifier circuit according to claim 1, wherein the voltage comparator includes a first MOS (Metal-Oxide Semiconductor) transistor and a first resistor, the positive input terminal, the negative input terminal, and the comparative output terminal are respectively connected to a source, a gate, and a drain of the first MOS transistor, the first resistor is connected between the drain of the first MOS transistor and the third terminal, the reference voltage generator includes a second MOS transistor in which a gate and a drain are commonly connected, and a second resistor, the second resistor is connected between the third terminal, which is one of the input terminals, and the drain of the second MOS transistor, the first terminal, which is the other input terminal, is connected to a source of the second MOS transistor, and the drain of the second MOS transistor is used as the voltage output terminal.

4. The rectifier circuit according to claim 1, wherein the voltage comparator includes a first MOS transistor and a third MOS transistor that operates as a constant current source, the positive input terminal, the negative input terminal, and the comparative output terminal are respectively connected to a source, a gate, and a drain of the first MOS transistor, the source of the third MOS transistor is connected to the third terminal, the reference voltage generator includes a second MOS transistor in which a gate and a drain are commonly connected, and a fourth MOS transistor that operates as a constant current source, the third terminal, which is one of the input terminals, is connected to a source of the fourth MOS transistor, the first terminal, which is the other input terminal, is connected to a source of the second MOS transistor, the drain of the second MOS transistor is used as the voltage output terminal, and a gate of the third MOS transistor and a gate of the fourth MOS transistor are commonly connected.

5. The rectifier circuit according to claim 2, wherein the voltage comparator includes a first MOS transistor and a first resistor, the positive input terminal, the negative input terminal, and the comparative output terminal are respectively connected to a source, a gate, and a drain of the first MOS transistor, the first resistor is connected between the drain of the first MOS transistor and the third terminal, the reference voltage generator includes a second MOS transistor in which a gate and a drain are commonly connected, and a second resistor, the second resistor is connected between the third terminal, which is one of the input terminals, and the drain of the second MOS transistor, the second terminal, which is the other input terminal, is connected to a source of the second MOS transistor, and the drain of the second MOS transistor is used as the voltage output terminal.

6. The rectifier circuit according to claim 2, wherein the voltage comparator includes a first MOS transistor and a third MOS transistor that operates as a constant current source, the positive input terminal, the negative input terminal, and the comparative output terminal are respectively connected to a source, a gate, and a drain of the first MOS transistor, a source of the third MOS transistor is connected to the third terminal, the reference voltage generator includes a second MOS transistor in which a gate and a drain are commonly connected, and a fourth MOS transistor that operates as a constant current source, the third terminal, which is one of the input terminals, is connected to a source of the fourth MOS transistor, the second terminal, which is the other input terminal, is connected to a source of the second MOS transistor, the drain of the second MOS transistor is used as the voltage output terminal, and a gate of the third MOS transistor and a gate of the fourth MOS transistor are commonly connected.

7. The rectifier circuit according to claim 3, wherein a ratio of a gate width to a gate length of the first MOS transistor is selected to be effectively lower than a ratio of a gate width to a gate length of the second MOS transistor.

8. The rectifier circuit according to claim 5, wherein a ratio of a gate width to a gate length of the first MOS transistor is selected to be effectively lower than a ratio of a gate width to a gate length of the second MOS transistor.

9. The rectifier circuit according to claim 4, wherein a ratio of a gate width to a gate length of the first MOS transistor is selected to be effectively lower than a ratio of a gate width to a gate length of the second MOS transistor.

10. The rectifier circuit according to claim 6, wherein a ratio of a gate width to a gate length of the first MOS transistor is selected to be effectively lower than a ratio of a gate width to a gate length of the second MOS transistor.

11. The rectifier circuit according to claim 4, wherein a current value of the third MOS transistor is set to be greater than a current value of the fourth MOS transistor.

12. The rectifier circuit according to claim 6, wherein a current value of the third MOS transistor is set to be greater than a current value of the fourth MOS transistor.

13. The rectifier circuit according to claim 3, wherein the current switching unit includes a fifth MOS transistor, the rectifier circuit further comprises:
    a sixth MOS transistor including a drain and a source respectively connected to a drain and a back gate of the fifth MOS transistor; and
    a seventh MOS transistor including a drain and a source respectively connected to a source and the back gate of the fifth MOS transistor,
a gate of the fifth MOS transistor and a gate of the sixth MOS transistor are connected, and
the comparative output terminal of the voltage comparator and a gate of the seventh MOS transistor are connected.

14. The rectifier circuit according to claim 4, wherein the current switching unit includes a fifth MOS transistor, the rectifier circuit further comprises:
    a sixth MOS transistor including a drain and a source respectively connected to a drain and a back gate of the fifth MOS transistor; and
    a seventh MOS transistor including a drain and a source respectively connected to a source and the back gate of the fifth MOS transistor,
a gate of the fifth MOS transistor and a gate of the sixth MOS transistor are connected, and
the comparative output terminal of the voltage comparator and a gate of the seventh MOS transistor are connected.

15. The rectifier circuit according to claim 5, wherein the current switching unit includes a fifth MOS transistor, the rectifier circuit further comprises:
    a sixth MOS transistor including a drain and a source respectively connected to a drain and a back gate of the fifth MOS transistor; and
    a seventh MOS transistor including a drain and a source respectively connected to a source and the back gate of the fifth MOS transistor,
a gate of the fifth MOS transistor and a gate of the sixth MOS transistor are connected, and
the comparative output terminal of the voltage comparator and a gate of the seventh MOS transistor are connected.

16. The rectifier circuit according to claim 6, wherein the current switching unit includes a fifth MOS transistor, the rectifier circuit further comprises:
    a sixth MOS transistor including a drain and a source respectively connected to a drain and a back gate of the fifth MOS transistor; and
    a seventh MOS transistor including a drain and a source respectively connected to a source and the back gate of the fifth MOS transistor,
a gate of the fifth MOS transistor and a gate of the sixth MOS transistor are connected, and
the comparative output terminal of the voltage comparator and a gate of the seventh MOS transistor are connected.

17. A contactless power supply device comprising a power supply circuit having the rectifier circuit according to claim 1.

18. A contactless power supply device comprising a power supply circuit having the rectifier circuit according to claim 2.

* * * * *